United States Patent [19]
Ito et al.

[11] Patent Number: 5,750,940
[45] Date of Patent: May 12, 1998

[54] COORDINATE INPUT TABLET WITH NOTCHED FILM SUBSTRATE

[75] Inventors: Takayuki Ito; Hideto Sasagawa; Takeshi Watanabe, all of Fukushima-ken, Japan

[73] Assignee: Alps Electric Co., Ltd., Tokyo, Japan

[21] Appl. No.: 744,963

[22] Filed: Nov. 7, 1996

[30]  Foreign Application Priority Data

Nov. 17, 1995  [JP]  Japan ................................. 7-299913

[51] Int. Cl.⁶ .............................. G08C 21/00; G09G 3/02
[52] U.S. Cl. .................... 178/18; 178/20; 345/173; 345/176
[58] Field of Search .......................... 178/18, 19, 20; 345/173, 175, 176, 179

[56]  References Cited

U.S. PATENT DOCUMENTS

| | | | |
|---|---|---|---|
| 4,731,508 | 3/1988 | Gibson et al. | 178/18 |
| 4,818,827 | 4/1989 | Ipcinski et al. | 178/18 |
| 5,008,497 | 4/1991 | Asher | 178/18 |
| 5,181,030 | 1/1993 | Itaya et al. | 345/173 |
| 5,220,136 | 6/1993 | Kent | 178/18 |

Primary Examiner—Steven Saras
Assistant Examiner—Vijay Shankar
Attorney, Agent, or Firm—Guy W. Shoup

[57] ABSTRACT

A tablet that hardly causes the fluctuation in the sheet resistance on a film substrate despite the small size of the tablet. The edge of one side of the film substrate requiring a notch for connector insertion are provided with other notches having the same depth as that of the notch for connector insertion, thereby notching most of the edge to the same depth.

4 Claims, 2 Drawing Sheets

5,750,940

COORDINATE INPUT TABLET WITH NOTCHED FILM SUBSTRATE

BACKGROUND OF THE INVENTION

1. Field of the Invention

The present invention relates to a tablet, or a touch sensor panel, arranged on the display screen of a liquid crystal display device or the like, used to enter a coordinate signal indicating a position on the tablet pressed by the finger or the like.

2. Description of the Related Art

Usually, the tablet of the above-mentioned type has a constitution in which a rectangular glass substrate is stacked thereon with a film substrate having generally the same shape, which is pressed at the upper surface thereof by the finger or the like for entering information. Namely, the film substrate is arranged on the lower side (the electrode side) thereof with a transparent resistor made of an ITO (Indium Tin Oxide) electrode or the like, a pair of electrodes extending along two sides in parallel to each other to come in contact with the resistor, and conductive patterns led from each of the electrodes to the vicinity of another side. Likewise, the glass substrate is arranged on the upper side (the electrode side) thereof with a transparent resistor, a pair of electrodes extending along two sides in parallel to each other to come in contact with the resister, and a variety of conductive patterns. These film substrate and glass substrate, in the stacked state, oppose the resistors thereof to each other and arrange the electrodes thereof at right angles to each other. One of the electrodes of the glass substrate is provided at the edge of one side with a connection land group that provides a terminal of each of the electrodes of both substrates. Fixing a connector (namely a flexible cable) to the connection land group by crimping connects the tablet electrically to peripheral equipment.

FIG. 4 shows a bottom view of a film substrate used on a conventional tablet comparatively small in size. As shown, the film substrate 1 is formed on the lower side (electrode side) thereof with a transparent resistor 2 entirely covering the film substrate, a pair of electrodes 3, 4 extending along two sides in parallel to each other to come in contact with the resister 2, and conductive patterns 5, 6 formed on an undercoat, not shown, and led from the electrodes 3, 4 to the vicinity of another side. The conductive patterns 5, 6 are formed at tips thereof with transfer forming sections 5a, 6a respectively. Via silver transfers, not shown, formed on the transfer forming sections by application, the pair of electrodes 3, 4 on the film substrate 1 are made conduct with a connection land provided on a glass substrate. The film substrate 1 is also formed at the edge of the side on the conductive patterns 5, 6 with a notch 7 of a predetermined length between the pair of transfer forming sections 5a and 6a for insertion of the above-mentioned connector. When the film substrate 1 is stacked on the glass substrate, the above-mentioned connection land group is exposed into the notch 7.

It should be noted that the film substrate and glass substrate of the tablet of the above-mentioned type are enhanced in productivity and reduced in cost by taking multiple pieces from a single large substrate formed on the entirety thereof with a transparent resistor and eliminating the necessity for etching the resistor.

Meanwhile, reduction in size of display apparatuses having the tablet of the above-mentioned type has been promoted recently. In doing so, it is necessary for a comparatively small tablet to form the electrodes 3, 4 and the conductive patterns 5, 6 of the film substrate 1 close to the external periphery of the film substrate 1 as shown in FIG. 4. However, because the film substrate 1 having the shape as shown in FIG. 4 needs to have depth d of about 2 to 2.5 mm of the notch 7 for connector insertion, an area narrower by d than others in the direction orthogonal to the pair of electrodes 3, 4 is formed. Consequently, the narrower portion in the center of the film substrate 1 enclosed by double-dot dash lines slightly increases in sheet resistance than the other portions having no notch. Such a positional fluctuation lowers coordinate positional detecting accuracy.

SUMMARY OF THE INVENTION

It is therefore an object of the present invention to provide a tablet having little positional fluctuation in the sheet resistance of a film substrate and providing a relatively high detection accuracy when the tablet is reduced in size.

In carrying out the invention and according to one aspect thereof, there is provided a tablet having: a film substrate generally rectangular in shape provided on all of one side thereof with a transparent resistor, a pair of electrodes along two parallel sides of the film substrate, the pair of electrodes coming in contact with the transparent resistor, and conductive patterns led from each of the pair of electrodes to the vicinity of another side of the film substrate, the conductive patterns ending in transfer forming sections; and a glass substrate rectangular in shape provided on one side thereof with a resistor and a pair of electrodes, the film substrate being stacked on the glass substrate, such that the resistors of both the substrates are opposed to each other, the electrodes of both the substrates are arranged orthogonal to each other, and a connection land group provided on the edge of the one side of the glass substrate is connected with a connector, the film substrate being provided on the edge of the one side to the conductive patterns with a first notch for inserting the connector and second notches located on both sides of the first notch and having a depth generally the same as that of the first notch. The second notches preferably provided by notching the film substrate from corners of the one edge to the conductive patterns to the vicinity of the transfer forming sections.

Namely, the edge of the one side of the film substrate requiring the notch, or the first notch, for connector insertion is provided with other notches, or the second notches with the same depth as that of the first notch, extending for example from the vicinity of the transfer forming sections to the corners of the film substrate. Thus, notching most of the edge of this side to the same depth makes generally equal the dimensions of the film substrate, on which all surface of each electrode is provided with the resistor, along the direction orthogonal to the pair of electrodes. Consequently, this novel constitution prevents the sheet resistance between both the electrodes from being fluctuated.

The above and other objects, features and advantages of the present invention will become more apparent from the accompanying drawings, in which like reference numerals are used to identify the same or similar parts in several views.

DESCRIPTION OF THE PREFERRED EMBODIMENT

Figure 1:
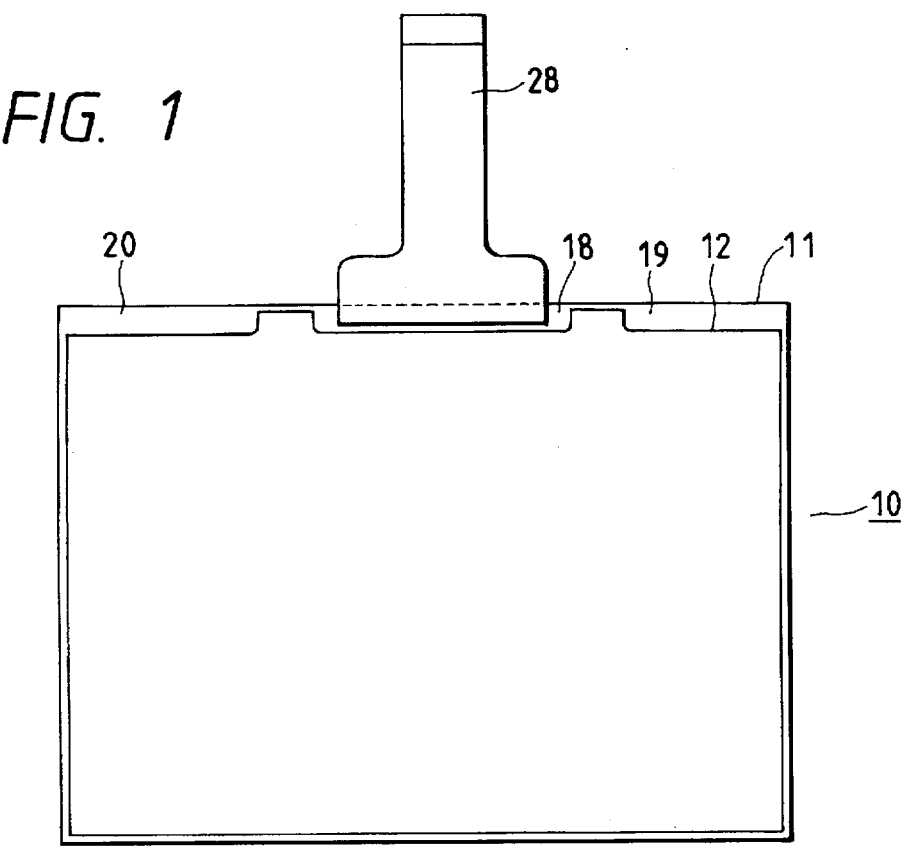
FIG. 1 is a top view illustrating a tablet practiced as one preferred embodiment of the present invention with a connector inserted.
Figure 2:
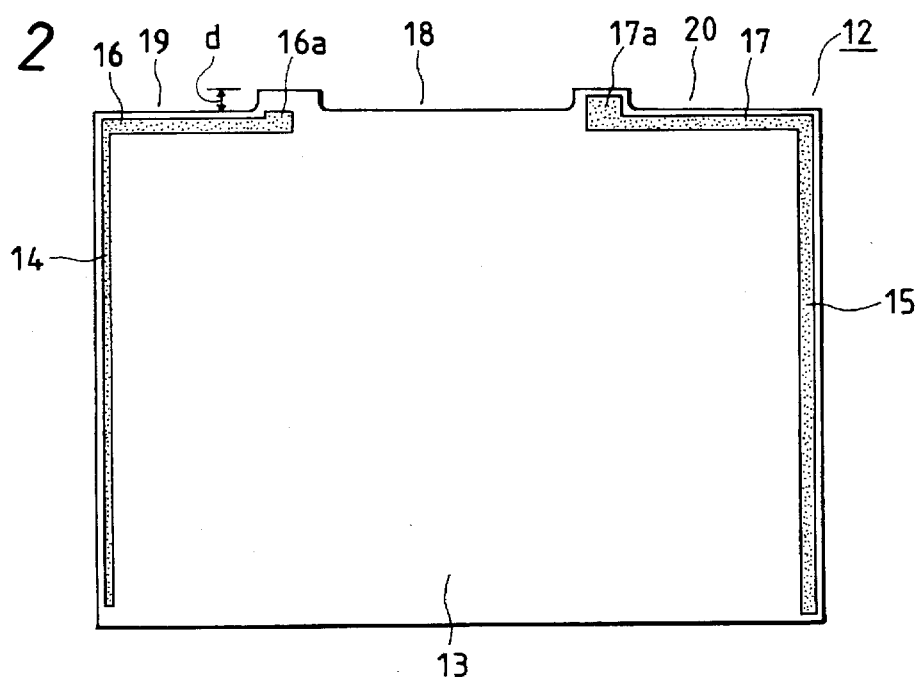
FIG. 2 is a bottom view illustrating a film substrate constituting the tablet of FIG. 1.
Figure 3:
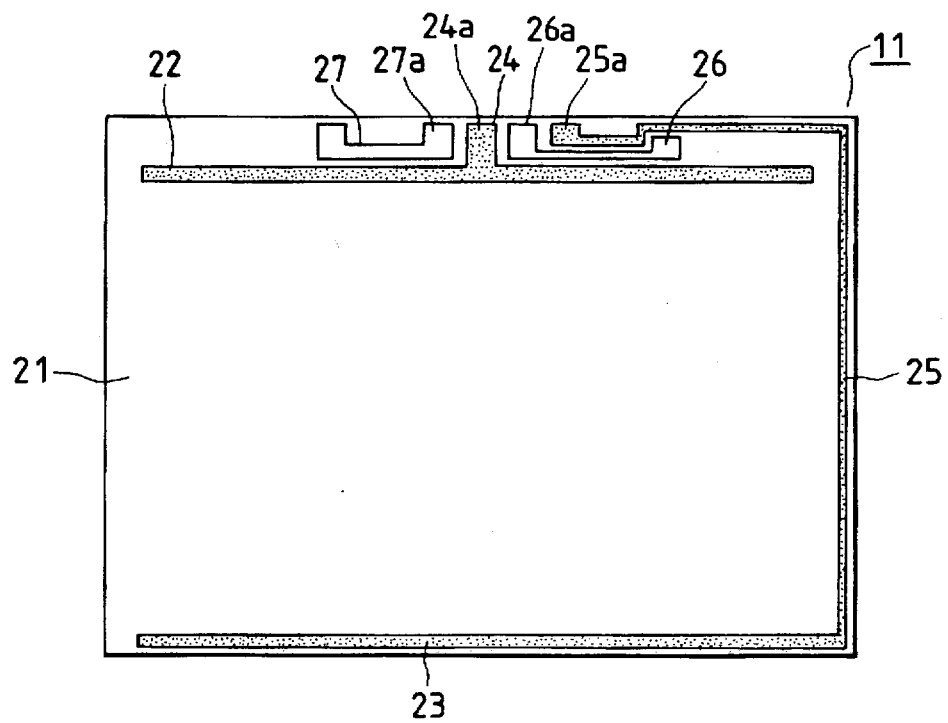
FIG. 3 is a top view illustrating a glass substrate constituting the tablet of FIG. 1.
Figure 4:
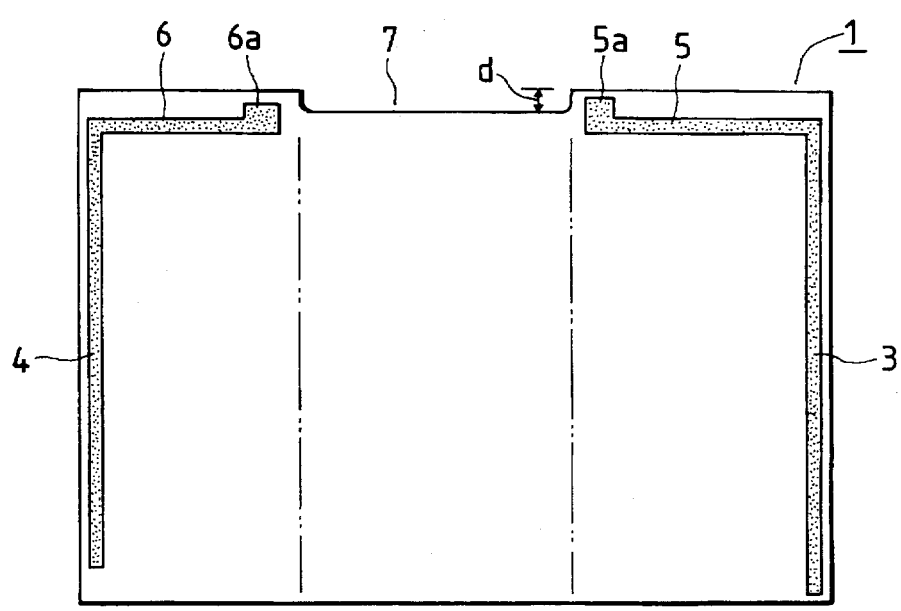
FIG. 4 is a bottom view of a film substrate used on a prior-art tablet.

The following describes one preferred embodiment of a tablet according to the present invention with reference to FIGS. 1 through 3.

As shown, the tablet 10 comprises a rectangular glass substrate 11 of 50 mm high and 70 mm wide for example and a film substrate 12 having generally the same shape as that of the glass substrate and stacked on the same. Both the substrates 11 and 12 are glued together with a sealant, not shown, applied around the opposed rims of both the substrates. The top surface of the film substrate 12 provides a pressure-operated panel.

The film substrate 12 is formed on the lower side thereof with a transparent resistor 13 made of ITO or the like covering the film substrate in its entirety, a pair of electrodes 14 and 15 extending along the left and right sides of the film substrate and coming in contact with the resistor 13, and conductive patterns 16 and 17 formed on an undercoat, not shown, and led from the electrodes 14 and 15 respectively to the vicinity of the upper side of the film substrate. The conductive patterns 16 and 17 end in transfer forming sections 16a and 17a respectively. Further, the film substrate 12 is formed at the center of the upper side thereof with a first notch 18 for insertion of a connector 28 of FIG. 1. The film substrate is further formed with a pair of second connectors 19 and 20 formed by notching the upper side thereof from the vicinity of the transfer forming sections 16a and 17a on both sides of the first notch 18 to the upper corners of the film substrate 12. Depth d of the second notches 19 and 20 is the same as that of the first notch 18. Namely, the film substrate 12 has the notches 19 and 20 of which depth is the same as that of the notch 18 for insertion of the connector (on a flexible cable for example) on the edge of the side at which the conductive patterns 16 and 17 are provided. Consequently, most of the edge of that side is notched to the equal depth, so that only minute print spaced for the transfer forming sections 16a and 17a projects by dimension d.

On the other hand, the glass substrate 11 is formed on the upper side thereof with a transparent resistor 21 made of ITO or the like that covers all the upper side, a pair of electrodes 22 and 23 extending along the upper and lower sides of the glass substrate and coming in contact with the resistor 21, a pair of conductive patterns 24 and 25 formed on an undercoat, not shown, and led from the electrodes 22 and 23 respectively to the vicinity of the upper side, and conductive patterns 26 and 27 provided for conducting with the transfer forming sections 16a and 17a via a silver transfer, not shown. Tip portions 24a through 27a of the conductive patterns 24 through 27 are formed into a connection land group to which the connector 28 of FIG. 1 is press-fit for connection.

The glass substrate 11 and the film substrate 12 are combined such that the resistors 13 and 21 of both the substrates 11 and 12 respectively are opposed to each other. And both the substrates 11 and 12 are stacked on each other to be integrated with the electrodes 14 and 15 arranged at right angles to the electrodes 22 and 23. Further, the connector 28 is press-fit for fixation to the glass substrate 11 exposed in the first notch 18 of the film substrate 12, thereby allowing the tablet to be electrically connected to external equipment by use of the connection lands 24a through 27a as terminals for the electrodes 14 and 15 and 22 and 23 of the substrates 11 and 12 respectively.

It should be noted that the surfaces of the glass substrate 11 and the film substrate 12 are covered with the resistors 13 and 21 respectively in their entirety. This is because, as mentioned above, a substrate having a relatively large area formed with the transparent resistor all over one of the surfaces thereof is cut into multiple pieces of smaller substrates, thereby enhancing productivity and reducing fabrication cost and eliminating the necessity for etching the resistor.

The above-mentioned tablet 10 is of a relatively small size of about 5.6 cm high and about 7.5 cm wide. With such a size, the prior-art technology causes a fluctuation in the sheet resistance on the film substrate, hardly providing a good coordinate positional detecting accuracy. In the present embodiment, not only the first notch 18 for connector insertion is provided on the edge of the side on the conductive patterns 16 and 17 of the film substrate 12, but also the second notches 19 and 20 having the same depth as that of the first notch 18 are provided by notching the film substrate 12 from the vicinity of the transfer forming sections 16a and 17a up to the upper corners of the film substrate 12. Consequently, because most of this edge is notched to the same depth, the film substrate 12 provided on all the lower surface (the electrode side) with the resistance 13 is generally constant in width dimension in the direction orthogonal to the pair of electrodes 14 and 15. This constitution allows the tablet 10 to significantly reduce the fluctuation in the sheet resistance between both the electrodes 14 and 15 of the film substrate 12, providing a good coordinate positional detecting accuracy despite the relatively small size of the tablet.

As described, the tablet according to the present invention has the constitution in which the edge of one side of the film substrate requiring the notch for connector insertion are provided with other notches having the same depth as that of the notch for connector insertion, thereby notching most of the edge to the same depth. The film substrate formed with the resistor all over its electrode side is generally constant in width dimension in the direction orthogonal to the pair of electrodes. Consequently, the fluctuation in the sheet resistance between both the electrodes is minimized to provide a conspicuous effect of significantly enhancing coordinate positional detecting accuracy despite the relatively small size of the tablet. Application of the present invention, therefore, promotes reduction in tablet size and increase in detection accuracy of the tablet.

While the preferred embodiment of the present invention has been described using specific terms, such description is for illustrative purposes only, and it is to be understood that changes and variations may be made without departing from the spirit or scope of the appended claims.

What is claimed is:

1. A tablet comprising:

a film substrate generally rectangular in shape provided on all of one side thereof with a transparent resistor, a pair of electrodes along two parallel sides of said film substrate, said pair of electrodes coming in contact with said transparent resistor, and conductive patterns led from each of said pair of electrodes to the vicinity of another side of said film substrate, said conductive patterns ending in transfer forming sections; and a glass substrate rectangular in shape provided on one side thereof with a resistor and a pair of electrodes, said film substrate being stacked on said glass substrate, such that the transparent resistor of the film substrate and the resistor of the glass substrate are opposed to each other, the electrodes of both the substrates are arranged orthogonal to each other, and a connection land group provided on the edge of the one side of said glass substrate is connected with a connector, wherein said film substrate is provided on the edge of the one side to said conductive patterns with a first notch for inserting said connector and second notches located on both sides of said first notch and having a depth generally the same as that of said first notch.

2. A tablet as claimed in claim 1, wherein said second notches are provided by notching said film substrate from corners of the edge of the one side to said conductive patterns to the vicinity of said transfer forming sections.

3. A tablet as claimed in claim 1, wherein said film substrate is provided in the center position of the edge of the one side to said conductive patterns with said first notch and said second notches provided on both sides of said first notch.

4. A tablet as claimed in claim 2, wherein said film substrate is provided in the center position of the edge of the one side to said conductive patterns with said first notch and said second notches provided on both sides of said first notch.

* * * * *